United States Patent [19]

Neff

[11] 4,163,145

[45] Jul. 31, 1979

[54] AQUARIUM HEATER

[76] Inventor: Paul C. Neff, 277 Park Ave., Antioch, Ill. 60002

[21] Appl. No.: 926,152

[22] Filed: Jul. 19, 1978

Related U.S. Application Data

[63] Continuation-in-part of Ser. No. 910,091, May 30, 1978, abandoned.

[51] Int. Cl.² .......................... H05B 1/02; H05B 3/80
[52] U.S. Cl. ....................................... 219/523; 119/5; 219/331; 219/335; 219/530; 219/544; 338/240
[58] Field of Search .............. 219/316, 318, 345, 331, 219/521, 535, 523, 530, 536, 540, 544; 338/221, 240, 241, 273, 274, 326; 119/73, 5; 126/367

[56] References Cited

U.S. PATENT DOCUMENTS

| | | | |
|---|---|---|---|
| 1,025,144 | 5/1912 | Kuhn | 338/241 X |
| 2,467,447 | 4/1942 | Strezoff | 219/527 X |
| 2,529,914 | 11/1950 | Challenner | 338/214 |
| 2,548,076 | 4/1951 | Strezoff | 219/527 X |
| 2,736,791 | 2/1956 | Krah et al. | 219/523 X |
| 3,305,820 | 2/1967 | Lennox | 338/240 |
| 3,728,517 | 4/1973 | Tilp | 219/523 X |
| 3,895,217 | 7/1975 | Hall et al. | 219/523 |
| 4,007,371 | 2/1977 | Njos et al. | 219/523 |
| 4,021,643 | 5/1977 | Hall et al. | 219/523 |

Primary Examiner—Volodymyr Y. Mayewsky
Attorney, Agent, or Firm—Kinzer, Plyer, Dorn & McEachran

[57] ABSTRACT

An aquarium heater having a heat resistant plastic housing. A heat producing electric resistance wire is positioned in the plastic housing in an aluminum foil container. In one embodiment, the container is an aluminum foil pouch which encloses the heat producing electric resistance wiring. The aluminum foil pouch is filled with sand. In another embodiment, the aluminum container is an annular pan and the electrical resistance wire is coiled in the pan.

6 Claims, 4 Drawing Figures

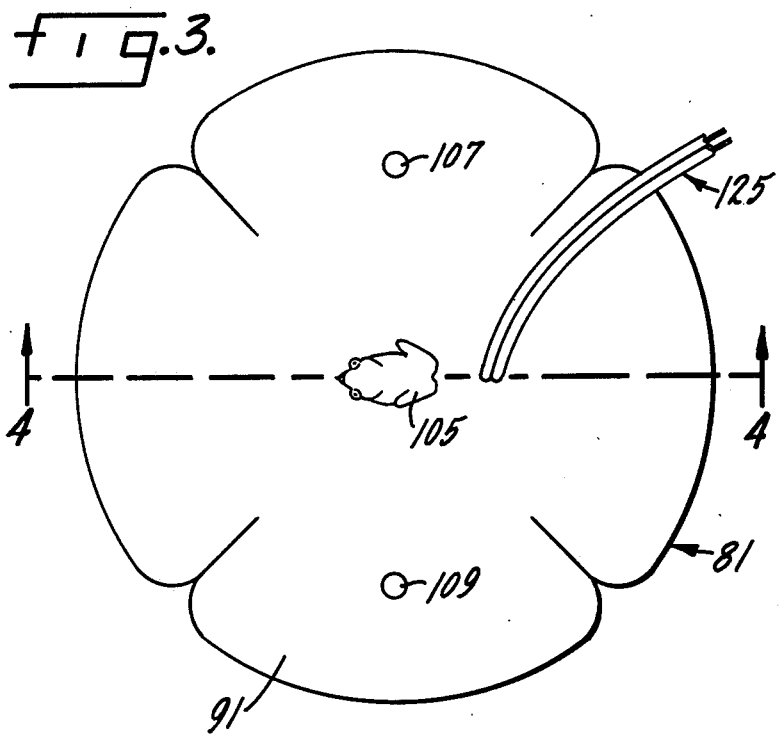
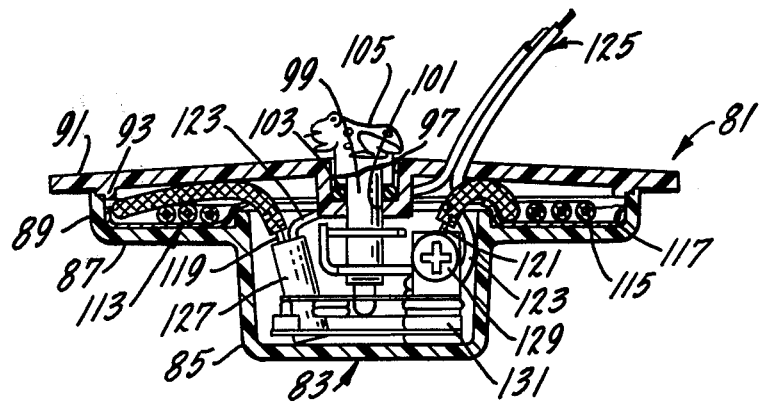

AQUARIUM HEATER

This is a continuation-in-part of my co-pending application Ser. No. 910,091, filed May 30, 1978, now abandoned.

BACKGROUND AND SUMMARY OF THE INVENTION

Thermostatically controlled heaters for aquariums have been proposed and built in recent years utilizing many different designs. Many of the various designs have been created in apparent attempts to solve the problem of overheating and the danger of electrical shock which are always present with the use of such devices in water filled aquariums. U.S. Pat. No. 2,736,791 to Krah et al shows an electric water heater having an insulated Nichrome resistance wire 34 wound in a coil and located in a heat resistant tube 1. Willinger U.S. Pat. No. 3,107,289 shows an aquarium heater having a heating element 19 comprising a grooved cylindrical body 36 of ceramic which supports heating coils 37, all of which fit in a heat resistant glass tube 11. Arak U.S. Pat. No. 3,564,589 shows an aquarium heater utilizing a tube 40 of heat resistant glass having a Nichrome heating element 28 mounted on a heat insulating block 63.

Volker U.S. Pat. No. 3,617,701 shows an immersible electric heating element having a quartz tube 12 in which is located an electric heating element comprising a resistance wire wound helically about a ceramic core. Bleiweis U.S. Pat. No. 3,731,058 shows an aquarium heater which, according to its specification, is designed to eliminate localized hot spots which can damage the aquarium heater housing. The heater has an electrical coil 26 located inside a heat resistant and transparent housing tube 11. The heating coil is helically enwrapped about a support member 30 with the helical turns seated in slots 33 of the support member. To prevent hot spots, the heating coil is provided with two mutually crossing helical portions over the entire extent thereof to provide a uniform heating of the heater housing tube 11.

U.S. Pat. Nos. 3,895,217 and 4,021,643 to Hall et al shows safety heaters for aquariums utilizing a heater element immersed in a heat conducting, thermally expansible liquid. U.S. Pat. No. 4,007,371 to Njos et al shows an immersion heater having a U-shaped heating rod 36 in direct contact with the water being heated.

An object of this invention is an electrical heater for an aquarium which is relatively simple and inexpensive to manufacture yet is resistant to overheating and free from the danger of electrical shock.

Another object of this invention is an aquarium heater having a plastic housing and a heater arrangement which will not develop hot spots in the plastic housing walls.

Another object of this invention is an aquarium heater which uses a low wattage insulated resistance rope heater.

Another object of this invention is a floating heater for an aquarium which is self righting if overturned.

Other objects may be found in the following specification, claims and drawings.

BRIEF DESCRIPTION OF THE DRAWINGS

The invention is illustrated more or less diagrammatically in the following drawings wherein:

FIG. 3 is a top plan view of a second embodiment of an aquarium heater of this invention; and FIG. 4 is a cross-sectional view taken along line 4—4 of FIG. 3.

DESCRIPTION OF THE PREFERRED EMBODIMENTS

Figure 1:
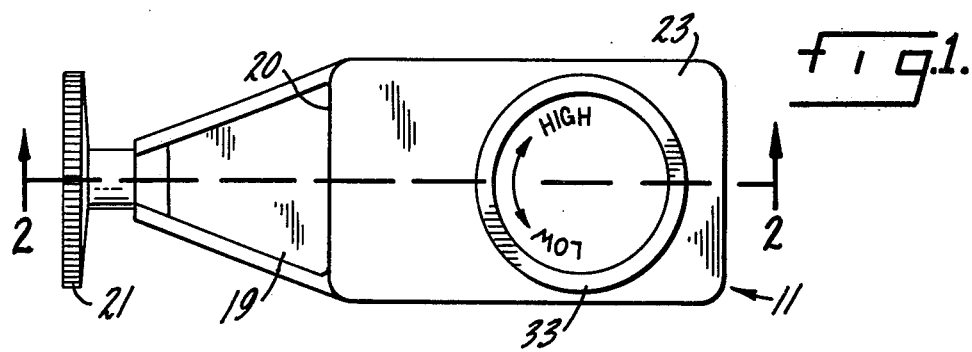
FIG. 1 is a top plan view of one embodiment of an aquarium heater of this invention.
Figure 2:
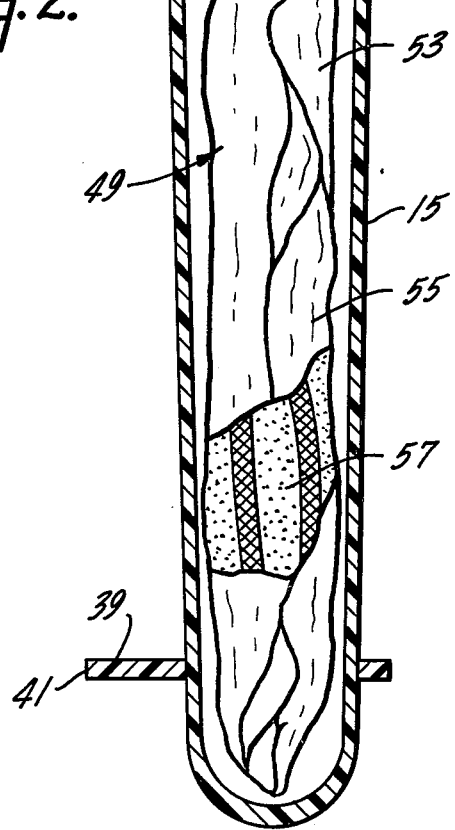
FIG. 2 is a cross-sectional view taken along line 2—2 of FIG. 1 with some parts broken away for clarity of illustration.

A first embodiment of the invention is shown in FIGS. 1 and 2 of the drawings incorporated in an aquarium heater 11. The aquarium heater 11 includes a heater housing 13 which may be injection molded from a suitable plastic such as a polycarbonate, a polyester, a nylon, a polysulfone or any other heat resistant plastic. The heater housing 13 includes a generally tubular portion 15 which is integrally formed with an upper portion 17 of generally rectangular cross-section. A bracket 19 extends integrally from one end wall 20 of the upper portion 17 and the bracket holds a threaded clamping screw 21. The end wall 20 and the clamping screw 21 engage opposite sides of an aquarium wall when the heater is installed in an aquarium.

A plastic cover 23 is separately formed and is attached to the upper portion 17 of the heater housing. The attachment of the cover may be accomplished in any conventional manner. The cover includes a raised boss 25 which encloses a variable thermostat 27. The adjustment shaft 29 of the thermostat extends through a passage 31 in the boss to connect to an operating knob 33. An O-ring 32 provides a seal between the thermostat shaft 29 and the boss 25.

A standoff 39 is located at the lower end of the tubular portion 15 of the heater housing 13 and has a length so that its outer edge 41 aligns with the end wall 20 of the upper portion 17 of the heater housing adjacent the clamping screw 21. The end wall 20 and outer edge 41 of the standoff will engage the inside of a wall of an aquarium to maintain the heater 11 in a vertical position.

The heater element 49 of this invention is located in the tubular portion 15 of the heater housing 13 and includes an insulated resistance rope 51 of Nichrome wire which is enclosed in a pouch 53 formed of aluminum foil 55 wrapped around the single loop of the rope heater wire. The pouch formed by the aluminum foil is filled with sand 57. Leads 59 and 61 from the heater element connect to a wire 63 of a cord 65 by means of a connector 67 and to a terminal 69 of the thermostat 27. The other wire 63 of the cord 65 connects to another thermostat terminal which is not shown. The wires 63 of the cord 65 are clamped between posts 70 formed integrally with the upper portion 17 of the heater housing. A neon bulb 71 and a resistor 73 also connect between the wires 63 of the cord 65.

A second embodiment of the invention is shown in FIGS. 3 and 4 of the drawings and is incorporated in a floating aquarium heater 81. The aquarium heater 81 includes a heater housing 83 which may be injection molded of a suitable plastic such as polycarbonate, a polyester, a nylon, a polysulfone or any other heat resistant plastic. The heater housing 83 includes a central tubular portion 85 which is integrally formed with a surrounding shallower annular portion 87. The annular portion 87 is bounded by an upstanding peripheral wall 89.

A plastic cover 91 is separately formed and for decorative purposes may be in the shape of a leaf or lily pad. A downwardly extending flange 93 is formed on the undersurface of the plastic cover and this flange engages the upstanding peripheral wall 89 of the housing 83. The cover 91 may be attached to the housing 83 in any conventional manner which will provide a watertight seal between the cover and the housing. For example, the attachment could be accomplished by ultrasonic fusing, adhesives, the use of threads, etc.

A central recess or well 97 is formed in the plastic cover 91 and an adjustment shaft 99 for a thermostat extends through an opening 101 in the bottom of the well. An O-ring 103 provides a watertight seal between the thermostat shaft 99 and the opening 101 in the bottom of the well. An operating knob 105 for the thermostat shaft 99 is fastened thereto. The knob is formed in the shape of a frog for decorative purposes and to complement the design of the lily-shaped cover 91. Indicia 107 and 109 are positioned on the top surface of the cover to indicate the limits of rotational adjustment of the thermostat shaft 99. The indicia may be spots of paint or molded protuberances, etc.

A heater element 113 of this invention is located in the shallow annular portion 87 of the heater housing 83. The heater element includes an insulated resistance wire rope 115 of Nichrome wire which is formed into a flat spiral coil. The coil of resistant wire rope is placed in an annular shaped aluminum foil pan 117 which sits in a shallow annular portion 87 of the heater housing. Leads 119 and 121 from the insulated resistant wire rope 115 connect to a wire 123 of a cord 125 by means of a connector 127 and to a terminal 129 of a thermostat 131. The other wire 123 of the cord 125 connects to the other terminal of the thermostat but this is not visible in the drawings. The cord passes through an opening in the plastic cover 91 which may be sealed by epoxy or any other suitable sealant in order to maintain the watertight integrity of the floating heater element.

The use, operation and function of this invention are as follows:

The heater element 49 of the first embodiment of this invention shown in FIGS. 1 and 2 of the drawings uses a low wattage insulated resistance rope heater to prevent overheating and resultant hot spots in the tubular portion 15 of the plastic heater housing 13. A 25-watt wire rope is used in order to limit the outside temperature of the heating element which contacts the plastic housing to 250° F. As a further precaution, the wire rope, which is formed in a single loop extending substantially the entire length of the tubular portion of the housing, is wrapped in aluminum foil, thereby forming a pouch. The pouch is filled with a granular dielectric mineral ballast such as sand. The sand and aluminum foil act together to evenly disperse the heat from the insulated resistance rope heater, thereby preventing hot spots and burnout of the tubular portion 15 of the heater housing. The uniform distribution of heat to the tubular portion of the housing is also brought about by the installation of the resistance wire in a single loop which is substantially coextensive with the length of the tubular portion of the housing. By means of this construction, the watts per unit surface of the tubular portion of the housing is held to a minimum.

Although the use of a single loop of resistant wire extending substantially coextensive with the length of the tubular portion of the heater housing is the preferred form of the invention, it should be understood that the end of the wire loop may be doubled back upon itself in order to make it fit properly in the tubular portion of the housing. The length of the resistance wire may be varied so long as the wattage of the wire is maintained constant. Any concentration of heat due to an increase in the amount of resistance wire in any portion of the tubular member is dispersed by the sand and aluminum foil surrounding the wire so that it does not create a hot spot in the wall of the heater housing.

In addition to assisting in the dispersal of heat from the resistance wire, the sand also acts as a ballast to enable the heater housing to float in an upright position if it becomes detached from the aquarium wall. Of course, other materials could be used as ballast such as lead shot, silicone oil, etc.

An additional factor of safety is built-in to the aquarium heater by using a 12 amp thermostat 27 which is designed to shut off at 100° F. The current passing through the wire rope heater is substantially less than one amp.

The heater element 113 of the second embodiment of the invention which is shown in FIGS. 3 and 4 of the drawings also uses a low wattage insulated resistance rope heater. As in the previous embodiment of the invention, a 25 watt rope is used in order to limit the outside temperature of the heating element which contacts the plastic housing to 250° F. In this embodiment, the wire rope, which is wound into a spiral coil, is seated in an annular shaped aluminum foil pan 117 which is located in the shallow annular portion 87 of the heater housing 83. The aluminum foil pan acts to evenly disperse the heat from the insulated resistance wire rope heater, thereby preventing hot spots and burnout of the heater housing 83.

As in the previous embodiment of the invention, an additional factor of safety is built into the aquarium heater by using a 12 amp thermostat 131. The current passing through the wire rope heater 115 is substantially less than one amp.

The construction of the heater 81 permits it to float in an upright position with the central tubular portion 85 and the shallower annular portion 87 immersed in the water. The positioning of the thermostat 131 in the central tubular portion 85 of the housing and the configuration of the heater housing 83 which has a central tubular portion 85 surrounded by a shallower annular portion 87, provides a floating heater that is practically always self-righting in the event it is overturned in the aquarium. The characteristic of the floating heater 81 to be self-righting is also aided by the electrical cord 125 which extends out of the top cover 91 of the housing. The inherent stiffness of the cord not only resists overturning of the heater but also assists in returning it to its upright position when it has been overturned.

Whereas, a preferred form of the invention has been shown and described, it should be understood that changes and variations may be made without departing from the scope of the invention which is defined in the claims appended hereto.

I claim:

1. An aquarium heater including:
   a heat resistant plastic housing having at least one end which is located in the water to be heated and at least one other end, at least a portion of which is located out of the water to be heated,
   said end of said housing which is located in the water to be heated is closed and said portion of the other end of the housing which is located out of the water to be heated has at least one opening therein, an insulated heat producing electrical resistance wire positioned in said housing and formed in the shape of at least one loop, a metallic foil enclosing at least a part of said loop of insulated wire and positioned between said insulated resistance wire and all portions of said housing which are normally in contact with the water to be heated, said metallic foil being formed and adapted to conduct and evenly distribute heat from the insulated electrical resistance wire to the plastic housing, means to connect said insulated electrical resistance wire to a source of electrical current with said means extending through said opening in the portion of the housing located out of the water, and means to control the flow of electrical current through said insulated electrical resistance wire.

2. The aquarium heater of claim 1 in which said plastic housing is of elongaged, generally tubular shape and said metallic foil is formed as a pouch enclosing said resistance wire.

3. The aquarium heater of claim 1 in which said plastic housing includes an annular chamber, said resistance wire is coiled in said annular chamber and is positioned on said metallic foil.

4. The aquarium heater of claim 2 in which said metallic foil pouch is filled with a granular dielectric mineral ballast.

5. The aquarium heater of claim 1 in which said means to control electrical current in said resistance wire includes an adjustable thermostat.

6. The aquarium heater of claim 3 in which the heater housing includes a central tubular portion which is deeper than the annular chamber which surrounds it and said means to connect the resistance wire to a source of electrical current and said means to control the flow of electrical current through said resistance wire are positioned in said tubular housing to increase stability of the heater when it is floating.

* * * * *